United States Patent [19]

Parmeggiani

[11] Patent Number: 4,626,644

[45] Date of Patent: Dec. 2, 1986

[54] METHOD AND APPARATUS FOR AUTOMATICALLY PRODUCING THIN-WALLED TUBES

[75] Inventor: Aldo Parmeggiani, Milan, Italy

[73] Assignee: CISE-Centro Informazioni Studi Esperienze S.p.A., Milan, Italy

[21] Appl. No.: 609,133

[22] Filed: May 11, 1984

[30] Foreign Application Priority Data

May 13, 1983 [IT] Italy .................................. 21095 A/83

[51] Int. Cl.⁴ ......................... B23K 9/02; B23K 9/225
[52] U.S. Cl. ...................................... 219/61; 219/61.5; 219/60 R
[58] Field of Search ..................... 219/61.5, 61.3, 61.4, 219/130.5, 61.7, 59.1, 60 R, 61, 64

[56] References Cited

U.S. PATENT DOCUMENTS

| | | | |
|---|---|---|---|
| 2,796,508 | 6/1957 | Holman et al. | 219/61 |
| 3,360,177 | 12/1967 | Enkvist | 219/61.5 X |
| 3,555,239 | 1/1971 | Kerth | 219/130.5 X |

Primary Examiner—E. A. Goldberg
Assistant Examiner—C. M. Sigda
Attorney, Agent, or Firm—Diller, Ramik & Wight

[57] ABSTRACT

A method for restarting the longitudinal welding seam when producing thin-walled tubes from a metal tape comprises the steps of starting welding with the tape in motion and the welding current amperage being gradually raised from zero to the steady state values, a steady state step in which the longitudinal welding seam is continuously produced and the welding current amperage is at its steady state value, a third step in which the welding is stopped and the welding current amperage is gradually decreased from its steady state value to nearly zero, and a restarting stage in which the welding seam is overcast partially behind the point at which it had been stopped and the welding current amperage is gradually raised from nearly zero to the steady state value once again. An apparatus for performing the method is also disclosed.

6 Claims, 4 Drawing Figures

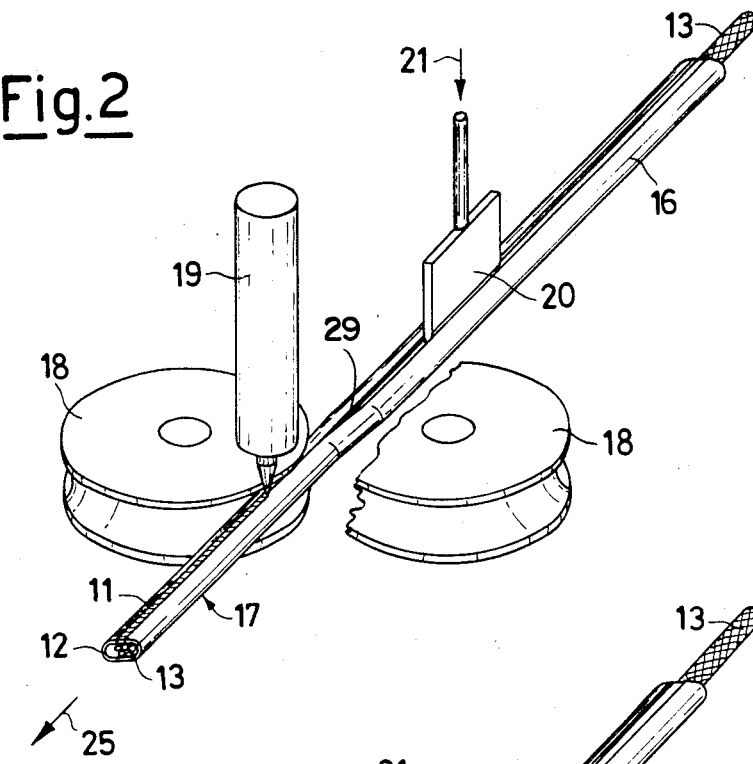
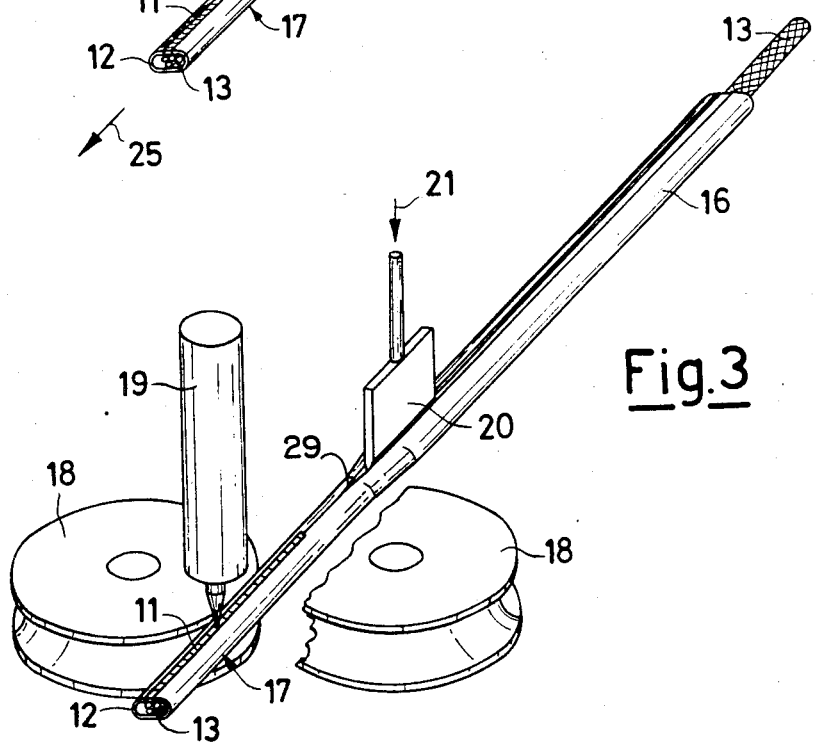

Fig. 4

| OPERATIONS | | CABLE FORWARD | CARRIAGE MOVEMENT | LAYOUT | WELDING CURRENT |
|---|---|---|---|---|---|
| A | "CYCLE START" | YES | 0→1 | | |
| B | "STEADY STATE" | YES | 1 | | |
| C | "CYCLE STOP" | NO | 1→0 | | |
| D | "CYCLE RESTART" | YES | 0→1 | | |

METHOD AND APPARATUS FOR AUTOMATICALLY PRODUCING THIN-WALLED TUBES

This invention relates to a method and an apparatus for producing thin-walled tubes which are longitudinally welded, in long lengths, that is lengths of more than a few kilometers.

The manufacturing process of welded tubes obtained by shaping a tape does not involve any special problems as to stop and restart of the productive run if the thickness of the workpieces exceeds 0.8 mm to 0.9 mm as an average. In addition, the lengths usually required in the trade from such installations do not exceed, as a rule, ten meters. The installations for the production of thin-walled tubes, for example for making hypodermic needles, are capable of continuously producing the article with the limitations inherent in the welding electrodes or, anyway, in the correct operation of the welding torch.

With the TIG process, such limitation is due to the evaporation of thorium as alloyed in the electrode, the formation of the melted drop and the resultant stop of the welding bath. Usually, this occurs after 2 or 3 hours of continuous operation.

With the plasma welding process, the limitation is to be attributed, instead, to the formation of carbon deposits (between the electrode and the clamps) which actually impair the processing continuity. This usually takes place after 6-8 hours of continuous operation (a working shift).

In the installations mentioned above, the stoppage of the welding run together with the impossibility of restarting same involves the acceptance of the as-produced length and the consequential start of another production cycle.

An objective of the present invention is to provide a method and an automatic apparatus for restarting the longitudinal welding seam in the production of thin-walled tubes or sheathed cables so as to make it possible to produce lengths longer than 4 km.

Having this objective in view, according to the present invention, it has been envisaged to provide a method for restarting the longitudinal welding seam in the production of thin-walled tubes as obtained from a shaped metal tape, more particularly adapted to sheath an electric conductor, any other thread-shaped article, or a bundle of such articles, comprising the steps of:

(a) a first step of "CYCLE START" in which the welding, shaping and cooling means are brought from an inoperative position to an operative position and the welding current is gradually raised from zero to a steady state value, the shaped tape being in motion;

(b) a second step, "STEADY STATE" in which the welding proceeds under steady conditions, the tape being in motion whereas the welding, shaping and cooling members are stationary in their operative positions;

(c) a third step, "CYCLE STOP" in which the welding, shaping and cooling members are brought back from their operative positions to their at rest positions and the welding current is gradually decreased from the steady state value to a nearly zero value, the shaped tape being latched at stillstand, and (d) a fourth step, "CYCLE RESTART" in which the welding and cooling members are shifted from their inoperative to their operative positions and the welding current is gradually raised from a nearly zero value to a steady state value, the shaped tape being in motion again, the invention also comprising an apparatus which comprises a slide, having driving means and being movable along a direction parallel to the machine direction of said shaped tape between said at rest position and said working position, and carrying adjustable longitudinal-seam welding means, there being additionally provided, downstream of the welding means aforementioned a cooling tub and a set of couples of shaping and guiding rollers, and, upstream thereof, at least a couple of shaping rollers for finishing the shaping of the tape.

The structural and functional features and the advantages of the method and the apparatus used for performing it according to the invention, will be more clearly understood from the ensuing nonlimiting description, aided by the accompanying drawings, wherein:

FIGS. 2 and 3 are perspective views of a single detail of the welding area in different working stages, and FIG. 4 is a diagram of the several working stages as performed by an apparatus according to the invention.

Figure 1:
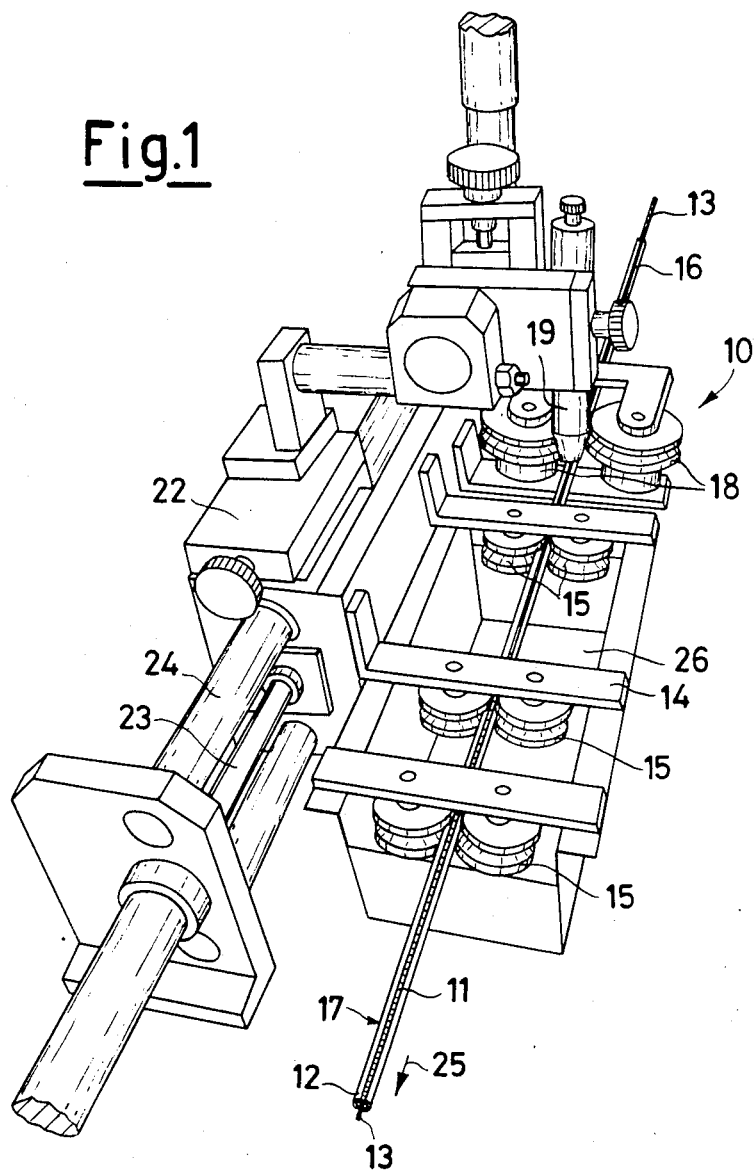
FIG. 1 is a diagrammatical perspective view of an apparatus according to the invention.

FIG. 1 shows an automatic machine 10 for restarting the longitudinal welding seam 11 in a process for producing thin-walled tubes 12 as obtained from a tape 16, and more particularly adapted to contain, for example, electric cables 13.

A frame 14, rigidly connected to a movable slide 22, bears a set of couples of rollers 15, of the pulley type, for holding the cable 17, so shaped and welded, within a cooling tub 26 containing a cooling medium. A couple of shaping rollers 18, at the inlet end of the machine 10, completes the shaping of the tape 16 prior to carrying out the longitudinal seam 11, that which is effected by a specially provided welding means or a welding member 19, to be selected consistently with the process used. Upstream of the couple of the shaping rollers 18 and the welding member 19, a blade 20 is provided, to guide and to position the electric cable 13 in the interior of the shaped tape 16, said blade 20 being equipped with feeding means 21 which are adapted to introduce a protective gas (such as argon) into the interior of the shaped tube (FIGS. 2, 3).

Prior to being welded by the welding means 19, the edges (unnumbered) of the tube 12/tape 16 are guided toward a point 29 (FIGS. 2 and 3) of general convergency therebetween at which point the blade 20 guides the elongated member 13 as heretofore noted to effect accurate encapsulation thereof by the shaped tube 12.

The welding member 19, the blade 20, the couples of rollers 15 and 18 and the cooling tub 26 are secured to a slide or carriage 22, which is equipped with driving means 23 which drive the slide on guideways 24 along a direction which is parallel to that of the cable 17, the forward motion being that of the arrow 25 and the backward motion taking place in the reverse direction.

The operation of an apparatus so conceived is diagrammatically set forth in the scheme of FIG. 4, namely: The rolled section 16, as obtained from a tape and enclosing in its interior the cable 13, is brought into registry with the couple of shaping rollers 18.

In said position, the blade 20 is slipped between the tape edges, which are still spaced apart, and acts so as to shift by a few millimeters the cable 13 away of the wall 16 of the tape to be welded, so as not to damage the cable, protective gas being meanwhile introduced as fed by means such as 21.

Once the shaped tape 16 and the cable 13 enclosed therein are introduced between the shaping rollers 18, the welding member 19 is started.

According to a program which is a function of the material to be processed, the welding current is raised up to the steady state value (as symbolized by 0 to 1) and the slide 22, driven by the driving means 23, sets the welding means 19 into the position where the welding operation begins. During this stage, called the "CYCLE START", the cable 17 so sheathed is fed forward along the direction of the arrow 25 as propelled by the shaping rollers of a shaping machine (not shown), while the welding means 19 are fed backwards and moved in a direction against that of the arrow 25. As the welding current has attained its maximum preset amperage value (1), the machine 10 is in its "steady" state, the cable 17 is being continually shaped and the carriage 22 holds the welding means 19 in its operative position (FIG. 2). Past the welding means 19, the cable 17 is immersed in the tub 26, an entity with the carriage 22, and is submerged in the cooling medium for at least one half of its thickness so as to be cooled.

It is now necessary to act so as to stop welding, such as for adjustments, control, or a stoppage due to the end of a workshop shift or for any other reason whatsoever. To obtain this, the cable 17 is stopped, the carriage 22, which carries the blade 20, the welding means 19, the couples of rollers 15 and 18 and the cooling tub 26, is carried from the area 1 to 0 and the already welded seam 11 is travelled over again, while, simultaneously, the welding current amperage is gradually decreased from the value 1 to the value 0 (FIG. 3).

The entire stage as now described is called "CYCLE STOP" and makes it possible to effect a stoppage in the production of the cable 17 without piercing the tube wall 12 or jeopardizing the integrity of the cable 13.

During a "CYCLE RESTART" stage, the operations performed during the "CYCLE START" stage are virtually repeated as such, that is, the carriage 22 brings the welding means 19, the roller couples 15 and 18 and the cooling tub 26 from the position 0 to the position 1 while the welding current amperage is gradually raised from the value 0 to the steady state value, as indicated by the reference numeral 1 herein.

During the latter stage, however, the welding means 19 and the couples of shaping rollers 18 travel over an already welded section once again, whereby the longitudinal welding seam 11 is overcast overwelded and its continuity and integrity are thus warranted while the internally enclosed cable 13 remains unaffected.

It is apparent that such a welding process and machine can be used with advantage also in those cases in which the tube 12 is to contain in its interior, once it has been welded, optical fibres, cable bundles or other particular articles, so as to obtain cables which are outstandingly resistant, for example, to heat and corrosion.

A cable 17 so constructed is then subjected, as a rule, to extrusion, so as to immobilize the cable or other article therein and, if necessary, also to correct the roundness of the tube.

The longitudinal welding operation can be effected both as a butt-welding or with a partial edge overlapping, or according to any other suitable technological operations.

I claim:

1. A method of starting, stopping and restarting welding to form a longitudinal welded seam during the production of thin-walled tubes from shaped metal tape comprising the steps of:
   (a) providing means for shaping, welding and cooling a metallic tube;
   (b) during a "CYCLE START" stage simultaneously shifting the shaping, welding and cooling means from a first inoperative position to a second operative position in a first direction and moving the shaped tube in a second direction opposite the first direction to the second operative position while gradually raising the welding current amperage from a zero value to a steady state value between said first and second positions thereby effecting welding at the second position;
   (c) during a "STEADY STATE" stage maintaining the shaping, welding and cooling means at the second position while continuously moving the shaped tube in the second direction to form a continuous longitudinally welded seam;
   (d) during a "CYCLE STOP" stage simultaneously shifting the shaping, welding and cooling means from the second operative position to the first inoperative position in the second direction and gradually decreasing the welding current amperage from the steady state value thereof to a nearly zero value, thus forming an end of the longitudinally welded seam while maintaining the shaped tube stationary; and
   (e) during a "CYCLE RESTART" stage simultaneously shifting the shaping, welding and cooling means from the first inoperative position toward the second operative position in the first direction while raising the welding current amperage from the nearly zero value of step (d) to and reaching the steady state value thereof at a point along the previously formed longitudinally welded seam spaced from the welded seam end and again continuously moving the shaped tube in the second direction creating an overwelded seam and a continuation of the longitudinally welded seam.

2. The method as defined in claim 1 including the step of shaping a tube about an elongated member during the movement of the shaped tube in the second direction by bringing edges of the shaped tube toward a point of general convergency therebetween, and adjacent the point of convergency guiding the elongated member to effect accurate incapsulation thereof by the shaped tube.

3. Apparatus for starting, stopping and restarting welding to form a longitudinal seam during the production of thin-walled tubes from shaped metal tape comprising:
   (a) means for shaping, welding and cooling a metallic tube;
   (b) means for simultaneously shifting the shaping, welding and cooling means from a first inoperative position to a second operative position in a first direction, means for moving the shaped tube in a second direction opposite the first direction to the second operative position, and means for gradually raising the welding current amperage from a zero value to a steady state value during the latter-noted movement between the first and second positions thereby effecting welding at said second position during a "CYCLE START" stage;
   (c) means for maintaining the shaping, welding and cooling means at the second position while the shaped tube is continuously moved by said moving means in the second direction to form a continuous longitudinally welded seam during a "STEADY STATE" stage;

(d) means for reversing the operation of said shifting means to shift the shaping, welding and cooling means from the second operative position to the first inoperative position in the second direction;

(e) means for gradually decreasing the welding current amperage from the steady state value thereof to a nearly zero value, thus forming an end of the longitudinally welded seam, and stopping the shaped tube moving means during a "CYCLE STOP" stage; and (f) again operating the shifting means for shifting the shaping, welding and cooling means from the first inoperative position toward the second operative in the first direction while raising new welding current amperage from the nearly zero value of step (d) to and reaching the steady state value at a point along the previous formed longitudinally welded seam spaced from the welded end, and again operating the moving means to continuously move the shaped tube in the second direction thereby creating an overwelded seam and a continuation of the longitudinally welded seam during a "CYCLE RESTART" stage of the apparatus.

4. The apparatus as defined in claim 3 including a slide carrying at least said welding means and said shifting means being effective for shifting at least said slide and welding means in said second direction generally parallel to said first direction.

5. The apparatus as defined in claim 4 wherein said cooling and shaping means are also carried by said slide.

6. The apparatus as defined in claim 5 including means for guiding an elongated member internally of the shaped tube as edges thereof are brought toward a point of general convergency to effect accurate encapsulation of the elongated member by the shaped tube.

* * * * *